United States Patent Office 3,501,519
Patented Mar. 17, 1970

3,501,519
α-SUBSTITUTED-(2,5-DIACYLOXYPHENYL)
ACETALDEHYDE
Louis L. Skaletzky, Kalamazoo, Mich., assignor to The
Upjohn Company, Kalamazoo, Mich., a corporation of
Delaware
No Drawing. Original application Sept. 25, 1964, Ser. No.
399,368, now Patent No. 3,412,109, dated Nov. 19,
1968. Divided and this application June 19, 1968, Ser.
No. 738,095
Int. Cl. C07c 69/78, 69/24
U.S. Cl. 260—476                                     4 Claims

ABSTRACT OF THE DISCLOSURE

New 2-lower-alkoxy-2,3-dihydro-3-substituted-5-benzofuranols are prepared from α-substituted-(2,5-dihydroxyphenyl) acetaldehyde diacylate intermediates by reacting the latter diester-aldehyde with an alkanol and an alkali metal alkoxide or hydroxide. The α-substituted-(2,5-dihydroxyphenyl)acetaldehyde diacylate intermediates are prepared from 2-amino-2,3-dihydro-3-substituted-5-benzofuranols by esterifying and deaminating the benzofuranol with an excess of a hydrocarboncarboxylic acid halide. The final product compounds are central nervous system depressants and can be used as sedatives.

Summary of the invention

This application is a division of application Ser. No. 399,368 filed Sept. 25, 1964 and now U.S. Patent No. 3,412,109, dated Jan. 19, 1968.

This invention pertains to novel organic chemical compounds, and to a process for preparing the same. The invention is more particularly directed to novel 2-lower-alkoxy - 2,3-dihydro-3-substituted-5-benzofuranols, novel α - substituted-(2,5-dihydroxyphenyl)acetaldehyde diacylate intermediates, and a process for preparing the same.

Detailed description of the invention

The novel 2 - lower-alkoxy-2,3-dihydro-3-substituted-5-benzofuranols of this invention have the structural formula:

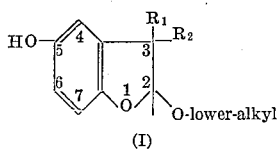

(I)

wherein $R_1$ is selected from the group consisting of hydrogen, lower-alkyl, and phenyl; and $R_2$ is selected from the group consisting of lower-alkyl and phenyl.

The novel α - substituted - (2,5-dihydroxyphenyl)acetaldehyde diacylate intermediates of this invention have the structural formula:

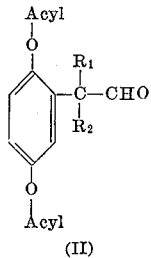

(II)

wherein $R_1$ and $R_2$ are as defined above, and "Acyl" is any hydrocarboncarboxylic acyl radical, conveniently one of from 1 to 8 carbon atoms, inclusive.

In accordance with the process of the invention, the novel 2-lower-alkoxy-2, 3-dihydro-3-substituted-5-benzofuranols of Formula I and the novel α-substituted-(2,5-dihydroxyphenyl)-acetaldehyde diacylate intermediates of Formula II are prepared from 2-amino-2,3-dihydro-3-substituted-5-benzofuranols of the formula:

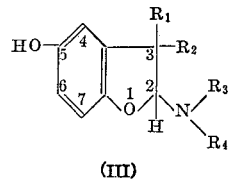

(III)

wherein $R_1$ and $R_2$ are as previously defined; $R_3$ and $R_4$ taken separately are selected from the group consisting of lower-alkyl, phenyl, and substituted phenyl selected from the group consisting of lower-alkylphenyl, lower-alkoxyphenyl, and halophenyl, provided that $R_3$ and $R_4$ are not simultaneously selected from phenyl and substituted phenyl; and $R_3$ and $R_4$ taken together with

constitute a saturated heterocyclic amino radical

of from 5 to 7 nuclear atoms, inclusive, wherein Z is a saturated bivalent radical selected from the group consisting of alkylene, oxadialkylene, thiadialkylene, and N-lower-alkylazadialkylene.

As employed herein, the term "lower-alkyl" includes methyl, ethyl, propyl, butyl, pentyl, hexyl, and isomeric forms thereof. The term "lower-alkoxy" includes methoxy, ethoxy, propoxy, butoxy, pentyloxy, hexyloxy, and isomeric forms thereof. The term "halophenyl" includes, for example, o-fluorophenyl, p-bromophenyl, 3,5-dichlorophenyl, 3, 4, 5-tribromophenyl, m-iodophenyl, o-chlorophenyl, and the like. And finally, the term "saturated heterocyclic amino radical

of from 5 to 7 nuclear atoms, inclusive," includes, for example, pyrrolidinyl, 2-methylpyrrolidinyl, 2-ethylpyrrolidinyl, 2, 2-dimethyl-pyrrolidinyl, 3, 4-dimethylpyrrolidinyl, 2-isopropylpyrrolidinyl, 2-sec. butylpyrrolidinyl, and like alkylpyrrolidinyl groups, morpholino, 2-ethylmorpholino, 2-ethyl-5-methylmorpholino, 3,3,-dimethylmorpholino, thiamorpholino, 3-methylmorpholino, 2, 3, 6-trimethylmorpholino, 4-methylpiperazinyl, 4-butylpiperazinyl, piperidino, 2-methylpiperidino, 3-methylpiperidino, 4-methylpiperidino, 4-propylpiperidino, 2-propylpiperidino, 4-isopropylpiperidino, and like alkylpiperidino groups, hexamethylenimino, 2-methylhexamethylenimino, 3, 6-dimethylhexamethylenimino, homomorpholino, and the like.

The novel compounds of Formula I are useful for a variety of purposes. For example, the compounds are useful as intermediates for reaction with phosgene to produce the corresponding chloroformates which in turn are reacted with ammonia, monomethylamine, dimethylamine, or any other primary or secondary amines to produce corresponding carbamates useful as insecticides. Insecticidal carbamates can also be prepared by reacting the compounds of Formula I with isocyanates such as methyl isocyanate, ethyl isocyanate, and the like.

The 2 - lower-alkoxy-2,3-dihydro-3,3-di-lower-alkyl-5-benzofuranols of Formula I have been found to be pharmacologically active as sedatives. They can be used as central nervous depressants in mammals, birds and other animals, e.g., mice, rats, and dogs. The compounds of Formula I are also useful as antioxidants.

The novel α-substituted-(2,5-dihydroxyphenyl)acetaldehyde diacylate intermediates (compounds of Formula II) are prepared from the 2-amino-2,3-dihydro-3-substituted-5-benzofuranols of Formula III by reaction with a hydrocarboncarboxylic acid halide. It has been found, in accordance with the novel process of the invention, that not only esterification occurs, but also removal of the 2-amino group, cleavage of the dihydrofuran ring, and resultant formation of an α-substituted-(2,5-dihydroxyphenyl)-acetaldehyde diacylate. The transformation of a 2-amino-2,3-dihydro-3-substituted-5-benzofuranol into an α-substituted-(2,5-dihydroxyphenyl)acetaldehyde diacylate is effected with an excess of hydrocarboncarboxylic acid halide in the presence of an organic solvent medium and an acid acceptor (water must be excluded). A reaction temperature in the range of about 15° C. to about 30° C. is convenient although lower and slightly higher temperatures can be used if desired. Suitable organic solvents include, for example, pyridine, ethylene dichloride, ether, benzene, toluene, and the like. Suitable acid acceptors include, for example, pyridine, triethylamine, N,N-dimethylaniline, picoline, lutedine, and the like. The α-substituted-(2,5-dihydroxyphenyl)acetaldehyde diacylate is recovered by conventional procedures. Illustratively, excess hydrocarbon carboxylic acid halide is decomposed by pouring the reaction mixture into water (preferably ice-water), and the water insoluble diester is recovered by any of several conventional methods.

For example, when a water-miscible organic solvent (e.g., pyridine) is used as a reaction medium, the product separates directly from the water mixture and can be recovered as a solid or oil. On the other hand, when a water-immiscible organic solvent (e.g., benzene) is used, the product is in solution in the organic layer and can thus be separated for further purification. Illustratively, the organic solvent is removed by evaporation or distillation and the residue is purified. An α-substituted-(2,5-dihydroxyphenyl)acetaldehyde diacylate can also be recovered from an organic solvent by chromatographic procedures. It is further purified by conventional procedures, for example, distillation and crystallization.

Although any hydrocarboncarboxylic acid halide can be used in the foregoing reaction, convenient suitable ones include acetyl chloride, propionyl chloride, butyryl bromide, caproyl chloride, capryloyl chloride, benzoyl chloride (preferred), phenyacetyl chloride, and the like.

The novel 2-lower-alkoxy-2,3-dihydro-3-substituted-5-benzofuranols (compounds of Formula I) are prepared from the α - substituted-(2,5-dihydroxyphenyl)acetaldehydediacylate intermediates of Formula II by reaction of the diester-aldehyde with an alkanol and an alkali metal alkoxide or hydroxide. This reaction effects an unexpected result in the reformation of the 2,3-dihydrobenzofuranol structure and substitution of an alkoxy group in the 2-position of the 2,3-dihydrobenzofuranol. The reaction proceeds at a temperature in the range of about 20° to about 100° C., conveniently at a temperature of about 50° to about 80° C. Suitable alkali metal alkoxides and hydroxides include, for example, sodium methoxide, sodium ethoxide, potassium ethoxide, sodium butoxide, sodium hexoxide, sodium hydroxide, potassium hydroxide, and the like. When an alkali metal alkoxide is used, the reaction mixture should be anhydrous, but when an alkali metal hydroxide is used, the reaction mixture can be aqueous. In general, it is preferred to use at least 3 molar amounts of the alkali metal alkoxide or hydroxide per molar amount of the diester-aldehyde. A preferred reaction mixture consists of the diester-aldehyde, an alkali metal hydroxide, an alkanol, and a small amount of water.

The 2 - lower-alkoxy-2,3-dihydro-3-substituted-5-benzofuranol is recovered by conventional procedures such as neutralizing the reaction mixture, evaporating the reaction medium, dilution with water, solvent extraction, drying, evaporation, chromatographic purification and crystallization.

The novel 2-lower-alkoxy-2,3-dihydro-3-substituted-5-benzofuranols of Formula I are also prepared from the 2-amino-2,3-dihydro-3-substituted-5-benzofuranols of Formula III by either of: (1) reaction with a quaternizing reagent, for example, an alkyl halide or a dialkyl sulfate in the presence of an alkanol, or (2) by heating with strong mineral acid in the presence of an alkanol.

When an alkyl halide or a dialkyl surfate is used, the reaction mixture containing a 2-amino-2,3-dihydro-3-substituted-5-benzofuranol is heated at a temperature in the range of about 50° to about 125° C., care being taken to prevent loss of volatile components of the reaction mixture. A reaction temperature in the range of about 70° to about 100° C. is preferred. The reaction proceeds relatively slowly and requires about 24 to about 72 hrs. for substantial completion. The lower reaction temperatures require more time than the higher reaction temperatures in accordance with well-known time:temperature relationships. In general, an excess of alkyl halide or dialkyl sulfate is used; conveniently, from about 1.5 to about 5 molar equivalents for each mole of the 2-amino-2,3-dihydro-3-substituted-5-benzofuranol. Suitable alkyl halides include, for example, methyl iodide (preferred), ethyl iodide, propyl iodide, butyl iodide, methyl bromide, and the like. The alkyl iodides are more reactive than alkyl bromides, which, in turn, are more reactive than alkyl chlorides. Suitable dialkyl sulfates include, for example, dimethyl sulfate (preferred), diethyl sulfate, diisopropyl sulfate, dibutyl sulfate, and the like. Suitable alkanols for the reaction and for the 2-lower-alkoxy substituent of Formula I include, for example, methanol, ethanol, propyl alcohol, isopropyl alcohol, butyl alcohol, pentyl alcohol, hexyl alcohol, and the like. The 2-lower-alkoxy - 2,3-dihydro-3-substituted-5-benzofuranol product is recovered by removing teh excess alkanol and purifying the product by conventional procedures such as chromatography and crystallization.

When a strong mineral acid and an alkanol are used, the reaction mixture is heated, for example, at the reflux temperature of the alkanol, until the reaction is completed. Any strong mineral acid can be used, for example, concentrated hydrochloric acid, concentrated sulfuric acid, and concentrated phosphoric acid. In general, the product is recovered by conventional methods, for example, removing the alkanol by evaporation, extracting the 2-lower-alkoxy-2,3-dihydro-3-substituted-5-benzofuranol with an organic solvent, washing with water to remove the amine salt formed in the reaction, neutralizing any reaction acid present in the extract, drying, distillation, and crystallization.

The 2 - amino-2,3-dihydro-3-substituted-5-benzofuranol starting compounds according to Formula III are prepared by condensing a (1-alkenyl)amine of the formula:

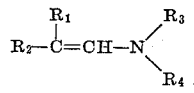

IV wherein $R_1$, $R_2$, $R_3$, and $R_4$ are as previously defined and p-benzoquinone, advantageously in the presence of an inert solvent and under substantially anhydrous conditions. Reaction of about equimolar amounts of the reactants is preferred, although an excess of the (1-alkenyl) amine can be employed if desired. The condensation reaction is exothermic, and the reaction mixture undergoes an initial evolution of heat. In some circumstances, depending somewhat on quantities and concentration of reactants and rate of mixing, the temperature of the reaction mixture will reach the boiling temperature. After the initial reaction subsides, the reaction is completed at about 25° C.; although it can also be completed at temperatures higher than 25° C. if desired, such as up to about 80° C. or even higher. Ordinarily, satisfactory yields are obtained after about 15 hrs. to about 48 hrs. at about 25° C.; but if desired, longer reaction times can be employed. Since the reaction is sometimes vigorously exothermic, it is often preferred to mix the reactants at a temperature in the range about 4° to about 10° C. and then permit the reaction mixture to warm to about 25° C. for completion of the reaction. Suitable inert solvents for the reaction include benzene, ethyl acetate, toluene, hexane, ether, tetrahyrdofuran, dioxane, chloroform, carbon tetrachloride, acetonitrile, and the like.

The 2-amino-2,3-dihydro-3-substituted-5-benzofuranols usually separate from the reaction mixture as solids and are recovered by filtration. The product can be further purified by conventional methods such as washing, and recrystallization from suitable solvents.

The following examples are illustrative of the process of the present invention, but the scope of the invention is not to be limited thereby.

Example 1.—Preparation of 2,3-dihydro-3,3-dimethyl-2-ethoxy-5-benzofuranol (Part A) 2,3-dihydro-3,3-dimethyl-2-piperidino-5-benzofuranol.—A solution of 43 g. (0.31 mole) of 1-(2-methylpropenyl)-piperidine in 100 ml. of benzene was added to a solution of 32.5 g. (0.30 mole) of p-benzoquinone in 300 ml. of benzene. The spontaneous exothermic reaction which accompanied the mixing increased the temperature and the mixture darkened. As the reaction mixture cooled, brown crystals began to appear as the temperature approached 25° C. After setting the mixture aside at about 25° C. for 2 days, the brown crystals were collected on a filter, and recrystallized from benzene. There was thus obtained 51 g. (69% yield) of 2,3-dihydro-3,3-dimethyl-2-piperidino-5-benzofuranol having a melting point of 157° to 158° C. A cream-colored analytical sample was obtained by recrystallization from a mixture of benzene and technical hexane (Skellysolve B, a mixture of isomeric hexanes having a boiling range of 140° to 160° F.). The melting point was 159° to 160° C.

*Analysis.*—Calcd. for $C_{15}H_{21}NO_2$ (percent): C, 72.84; H, 8.56; N, 5.66. Found (percent): C, 72.83; H, 8.29; N, 5.37.

(Part B) α,α-dimethyl-(2,5-dihydroxyphenyl)acetaldehyde dibenzoate.—A solution of 50 g. (0.2 mole) 2,3-dihydro-3,3-dimethyl-2-piperidino-5-benzofuranol (Part A above) and 100 ml. benzoyl chloride in 500 ml. pyridine was kept at about 25° C. for 5 hrs. The reaction mixture was poured into ice-water and the mixture was set aside until an oil that had separated solidified. The solid was recovered on a filter, washed with water, and dissolved in chloroform. The chloroform solution was washed successively with dilute hydrochloric acid and aqueous sodium bicarbonate, and dried over anhydrous magnesium sulfate. After removing the chloroform by evaporation under reduced pressure, the residue was recrystallized two times from a mixture of benzene and technical hexane to give 65.2 g. (83% yield) of α,α-dimethyl-(2,5-dihydroxyphenol)acetaldehyde dibenzoate having a melting point of 141° to 142° C. An analytical sample recrystallized from a mixture of benzene and technical hexane had a melting point of 143° to 144° C.

*Analysis.*—Calcd. for $C_{24}H_{20}O_5$ (percent): C, 74.21; H, 5.19. Found (percent): C, 74.43; H, 5.51.

(Part C) 2,3-dihydro-3,3-dimethyl-2-ethoxy-5-benzofuranol.—A reaction mixture consisting of 11.0 g. α,α-dimethyl-(2,5-dihydroxyphenyl)acetaldehyde dibenzoate (Part B above), 200 ml. ethanol (95%), 15 ml. water, and 20.0 g. aqueous sodium hydroxide (50% by weight) was heated at the reflux temperature for ½ hr. The reaction mixture was cooled, 15 ml. of glacial acetic acid was added, and the solvent was removed by evaporation under reduced pressure. The residue thus obtained was dispersed in a mixture of ether and water and the ether layer was separated. The ether solution was washed with water, sodium bicarbonate solution, dried over anhydrous magnesium sulfate, and the ether removed by evaporation. There was thus obtained 6.6 g. of an oil. It was dissolved in methylene chloride and the solution was poured into a column of magnesia silica gel adsorbent (Florisil). After eluting the column with a mixture of acetone and technical hexane (1:19 by volume) and evaporating the solvents from the eluate, there was obtained 4.5 g. (76% yield) of 2,3-dihydro-3,3-dimethyl-2-ethoxy-5-benzofuranol having a melting point of 73° to 74° C. One recrystallization from a mixture of ether and pentane gave the compound as a white solid having a melting point of 74° to 75° C.

*Analysis.*—Calcd. for $C_{12}H_{16}O_3$ (percent): C, 69.21; H, 7.74. Found (percent): C, 69.15; H, 7.74.

Following the same procedure but substituting methanol, isopropyl alcohol, tert-butyl alcohol, n-pentyl alcohol, and n-hexyl alcohol for ethanol, there were prepared 2,3-dihydro-3,3-dimethyl-2-methoxy-5-benzofuranol, 2,3-dihydro-3,3-dimethyl-2-isopropoxy-5-benzofuranol, 2-tert-butoxy-2,3-dihydro-3,3-dimethyl-5-benzofuranol, 2,3-dihydro-3,3-dimethyl-2-n-pentyloxy-5-benzofuranol, and 2,3-dihydro - 3,3-dimethyl-2-n-hexyloxy-5-benzofuranol, respectively.

Example 2.—Preparation of 2,3-dihydro-2-ethoxy-3-isopropyl-5-benzofuranol (Part A) 2,3-dihydro-3-isopropyl-2-piperidino-5-benzofuranol.—A solution of 21.5 g. (0.2 mole) of p-benzoquinone and 30.5 g. (0.2 mole) of 1-(3-methyl-1-butenyl)-piperidine in 400 ml. of benzene was set aside at about 25° C. for 3 days. A brown solid that separated was collected in a filter and recrystallized from a mixture of benzene and technical hexane to give 28 g. (54% yield) of 2,3-dihydro-3-isopropyl-2-piperidino-5-benzofuranol having a melting point of 152° to 158° C. Two recrystallizations from benzene gave an analytical sample melting at 156° to 158° C.

*Analysis.*—Calcd. for $C_{16}H_{23}NO_2$ (percent): C, 73.53; H, 8.87; N, 5.36. Found (percent): C, 73.43; H, 8.90; N, 5.28.

(Part B) α - isopropyl-(2,5-dihydroxyphenyl)acetaldehydedibenzoate.—Following the procedure of Example 1, Part B, but substituting 2,3-dihydro-3-isopropyl-2-piperidino-5-benzofuranol for 2,3-dihydro-3,3-dimethyl-2-piperidino-5-benzofuranol, there was prepared α-isopropyl-(2,5-dihydroxyphenyl)acetaldehyde dibenzoate.

(Part C) 2,3 - dihydro-2-ethoxy-3-isopropyl-5-benzofuranol.—Following the procedure of Example 1, Part C, but substituting α - isoropyl - (2,5-dihydroxyphenyl)acetaldehyde dibenzoate for α,α-dimethyl-(2,5-dihydroxyphenyl)-acetaldehyde dibenzoate, there was prepared 2,3-dihydro-2-ethoxy-3-isopropyl-5-benzofuranol.

Example 3.—Preparation of 2,3-dihydro-2-ethoxy-3-phenyl-5-benzofuranol (Part A) 2,3-dihydro-3-phenyl-2-piperidino-5-benzofuranol hydrochloride.—A reaction mixture consisting of 5.4 g. (0.05 mole) of p-benzoquinone and 9.5 g. (0.05 mole) of 1-styrylpiperidine in 100 ml. of ethyl acetate was set aside at about 25° C. for 24 hrs. The mixture was then concentrated by evaporating the solvent under reduced pressure. The residue thus obtained was dissolved in ether and the ether solution was treated with ethereal hydrogen chloride. A precipitate that formed was collected on a filter and recrystallized from absolute ethanol to give 3.9 g. of 2,3-dihydro-3-phenyl-2-piperidino-5-benzofuranol hydrochloride having a melting point of 222° to 225° C. [with decomposition (yellowing) at 215° C.]. The compound was recrystallized three times from a mixture of methanol and ether, and it had a melting point of 222° to 224° C. (with decomposition).

*Analysis.*—Calcd. for $C_{19}H_{21}NO_2 \cdot HCl$ (percent): C, 68.76; H, 6.68; N, 4.22. Found (percent): C, 68.48; H, 6.83; N, 4.11.

(Part B) α-phenyl-(2,5-dihydroxyphenyl)acetaldehyde dibenzoate.—Following the procedure of Example 1, Part B, but substituting 2,3-dihydro-3-phenyl-2-piperidino-5-benzofuranol hydrochloride for 2,3-dihydro-3,3-dimethyl-2-piperidino-5-benzofuranol, there was prepared α-phenyl-(2,5-dihydroxyphenyl)-acetaldehyde dibenzoate.

(Part C) 2,3 - dihydroxy-2-ethoxy-3-phenyl-5-benzofuranol.—Following the procedure of Example 1, Part C, but substituting α-phenyl-(2,5-dihydroxypenyl)acetaldehyde dibenzoate for α,α-dimethyl-(2,5-dihydroxyphenyl)-acetaldehyde dibenzoate, there was obtained 2,3-dihydro-2-ethoxy-3-phenyl-5-benzofuranol.

Example 4.—Preparation of 2,3-dihydro-2-ethoxy-3-ethyl-5-benzofuranol (Part A) 2,3 - dihydro-3-ethyl-2-piperidino-5-benzofuranol.—A solution of 10.8 g. (0.1 mole) of p-benzoquinone and 14.0 g. (0.1 mole) of 1-(1butenyl)piperidine in 250 ml. of benzene was set aside at about 25° C. for about 20 hrs. The solid that had separated was collected on a filter and recrystallized from ethyl acetate using an activated carbon for decolorization. There was thus obtained 8.9 g. of 2,3-dihydro-3-ethyl-2-piperidino-5-benzofuranol having a melting point of 175° to 184° C. After two more recrystallizations from ethyl acetate the compound was obtained as a pinkish-white solid having a melting point of 176° to 183° C.

Analysis.—Calc'd for $C_{15}H_{21}NO_2$ (percent): C, 72.84; H, 8.56; N, 5.66. Found (percent): C, 72.69; H, 8.96; N, 5.50.

(Part B) α-ethyl-(2,5-dihydroxyphenyl)acetaldehyde dibenzoate.—Following the procedure of Example 1, Part B, but substituting 2,3-dihydro-3-ethyl-2-piperidino-5-benzofuranol for 2,3-dihydro-3,3-dimethyl-2-piperidino-5-benzofuranol, there was prepared α-ethyl-(2,5-dihydroxyphenyl) acetaldehyde dibenzoate.

(Part C) 2,3 - dihydro - 2-ethoxy-3-ethyl-5-benzofuranol.—Following the procerdure of Example 1, Part C, but substituting α-ethyl-(2,5-dihydroxyphenyl)acetaldehyde dibenzoate for α,α-dimethyl-(2,5-dihydroxphenyl) acetaldehyde dibenzoate, there was prepared 2,3-dihydro-2-ethoxy-3-ethyl-5-benzofuranol.

Example 5.—Alternative preparation of 2,3-dihydro-3,3-dimethyl-2-ethoxy-5-benzofuranol A solution consisting of 10 g. of 2,3-dihydro-3,3-dimethyl-2-piperidino-5-benzofuranol (Example 1, Part A), 10 ml. concentrated sulfuric acid (18 M), and 200 ml. absolute ethanol was heated at the reflux temperature for 2½ days. After cooling, most of the ethanol was removed by evaporating under reduced pressure, and the residue was dissolved in a mixture of ether and water. The ether layer was separated from the aqueous layer, washed with aqueous sodium bicarbonate, and dried over anhydrous magnesium sulfate. After removing the ether by evaporation, an oil that remained was distilled at 131° to 132° C. and 1.0 to 1.1 mm. of mercury pressure. There was thus obtained 6.02 g. (71% yield) of 2,3-dihydro-3,3-dimehyl-2-ethoxy-5-dibenzofuranol as a viscous oil which crystallized when triturated in the presence of seed crystals, with a mixture of ether and pentane. The product was thus obtained as a white solid having a melting point of 73° to 75° C.

Example 6

(Part A) 2,3-dihydro-3,3dimethyl-2-(4-methyl-1-piperazinyl)-5-benzofuranol.—A solution of 38 g. (0.35 mole) of p-benzoquinone and 55.5 g. (0.36 mole) of 1-(2-methylpropenyl)-4-methylpiperazine in 600 ml. of benzene was set aside at about 25° C. for 24 hours. A brown solid that separated was collected on a filter and the filter cake was washed with technical hexane. There was thus obtained 63 g. (68.5% yield) of 2,3-dihydro-3,3-di methyl - 2 - (4 - methyl - 1 - piperazinyl) - 5 - benzofuranol having a melting point of 184° to 186° C. After two recrystallizations from ethyl acetate the compound had a melting point of 195° C.

Analysis.—Calc'd for $C_{15}H_{22}N_2O_2$ (percent): C, 68.87; H, 8.45; N, 10.68. Found (percent): C, 68.42; H, 8.36; N, 10.72.

(Part B) 2,3 - dihydro - 3,3-dimethyl-2-ethoxy-5-benzofuranol.—Following the procedure of Example 5, but substituting 2,3 - dihydro - 3,3 - dimethyl-2-(4-methyl-1-piperazinyl)-5-benzofuranol for 2,3-dihydro-3,3-dimethyl-2-piperidino-5-benzofuranol, there was prepared 2,3-dihydro-3,3-dimethyl-2-ethoxy-5-benzofuranol.

Example 7

(Part A) 2,3 - dihydro - 3,3-dimethyl-2-morpholino-5-benzofuranol.—A solution of 10.5 g. (0.098 mole) of p-benzoquinone and 14.0 g. (0.1 mole) of 4-(2-methylpropenyl)morpholine in 250 ml. of benzene was set aside at about 25° C. for 3 days. A red solid that separated was collected on a filter, and the filter cake was triturated with hot methylene chloride. After again collecting the solid on a filter, it was recrystallized two times from ethyl acetate to give 4.8 g. of 2,3-dihydro-3,3-dimethyl-2-morpholino-5-benzofuranol having a melting point of 187° to 189° C. An analytical sample obtained by recrystallization from ethyl acetate had a melting point of 187° to 188° C.

Analysis.—Calc'd for $C_{14}H_{19}NO_3$ (percent): C, 67.44; H, 7.68; N, 5.62. Found (percent): C, 67.74; H, 7.83; N, 5.58.

(Part B) 2,3 - dihydro - 3,3-dimethyl-2-ethoxy-5-benzofuranol.—Following the procedure of Example 5, but substituting 2,3 - dihydro - 3,3 - dimethyl-2-morpholino-5-benzofuranol for 2,3-dihydro-3,3-dimethyl-2-piperidino-5-benzofuranol, there was prepared 2,3-dihydro-3,3-dimethyl-2-ethoxy-5-benzofuranol.

Example 8.—Alternative preparation of 2,3-dihydro-3,3-dimethyl-2-ethoxy-5-benzofuranol A mixture consisting of 10 g. 2,3-dihydro-3,3-dimethyl-2-piperidino-5-benzofuranol, 20 ml. methyl iodide, and 50 ml. of absolute ethanol was heated on a steam bath in a sealed tube for 16 hrs. The ethanol was removed from the reaction mixture by evaporation under reduced pressure. The residue was dissolved in methylene chloride, and the solution was poured onto a column of magnesia silica gel adsorbent (Florisil). The column was eluted with a mixture of acetone and technical hexane (1:9 by volume), and the eluate was concentrated by evaporating the solvent under reduced pressure. There was thus obtained 3.2 g. of 2,3-dihydro-3,3-dimethyl-2-ethoxy-5-benzofuranol having a melting point of 74° to 75° C.

Example 9

(Part A) 2,3 - dihydro-3,3-dimethyl-2-(1-pyrrolidinyl)-5-benzofuranol.—A solution of 10.5 g. (0.098 mole) of p-benzoquinone and 12.5 g. (0.1 mole) of 1-(2-methylpropenyl)pyrrolidine in 250 ml. of benzene was set aside at about 25° C. for 24 hrs. A precipitate that formed was collected on a filter, and recrystallized two times from ethyl acetate. There was thus obtained 8.6 g. of 2,3-dihydro - 3,3 - dimethyl-2-(1-pyrrolidinyl)-5-benzofuranol having a melting point of 154° to 155° C. After a third recrystallization from ethyl acetate an analytical sample melting at 154° C. was obtained.

Analysis.—Calc'd for $C_{14}H_{19}NO_2$ (percent): C, 72.07; H, 8.21; N, 6.00. Found (percent): C, 72.07; H, 8.21; N, 5.72.

(Part B) 2,3 - dihydro - 3,3-dimethyl-2-ethoxy-5-benzofuranol.—Following the procedure of Example 8, but substituting 2,3 - dihydro - 3,3 - dimethyl-2-(1-pyrrolidinyl)-5-benzofuranol for 2,3-dihydro-3,3-dimethyl-2-piperidino-5-benzofuranol, there was prepared 2,3-dihydro-3,3-dimethyl-2-ethoxy-5-benzofuranol.

Example 10

(Part A) 2,3-dihydro-3,3-dimethyl-2-(hexahydro-1H-azepin-1-yl)-5-benzofuranol hydrochloride.—A solution of 38 g. (0.35 mole) of p-benzoquinone and 56 g. (0.365 mole) of 1-(2-methylpropenyl)hexamethylenimine in 600 ml. of benzene was set aside at about 25° C. for 24 hrs. The reaction mixture was concentrated by evaporating the benzene under reduced pressure, and the residue thus obtained was dissolved in ether. The ether solution was treated with ethereal hydrogen chloride and a precipitate formed. The precipitate was collected on a filter, triturated with a hot mixture of isopropyl alcohol and ether, and again recovered on a filter. The filter cake was recrystallized from a mixture of ethanol and ether to give 74.5 g. (70% yield) of 2,3-dihydro-3,3-dimethyl-2-(hexahydro-1H-azepin-1-yl)-5-benzofuranol hydrochloride having a melting point of 222° to 226° C. Another recrystallization from a mixture of methanol and ether gave an analytical sample melting at 227° to 229° C.

Analysis.—Calcd. for $C_{16}H_{23}NO_2 \cdot HCl$ (percent): C, 64.52; H, 8.12; N, 4.70. Found (percent): C, 64.28; H, 8.24; N, 4.77.

(Part B) 2,3-dihydro-3,3-dimethyl-2-ethoxy-5-benzofuranol.—Following the procedure of Example 8, but substituting 2,3 - dihydro - 3,3 - dimethyl-2-(hexahydro-1H-azepin-1-yl)-5-benzofuranol hydrochloride for 2,3-dihydro-3,3-dimethyl-2-piperidino-5-benzofuranol, there was prepared 2,3-dihydro - 3,3 - dimethyl - 2 - ethoxy-5-benzofuranol.

Example 11

Following the procedure of Example 1, Part A, but replacing 1-(2-methylpropenyl)piperidine with 4-(2-ethyl-1-octenyl)morpholine,
4-(2,3-dimethyl-1-butenyl)morpholine,
4-(2-methyl-1-heptenyl)morpholine,
4-(2-butyl-1-hexenyl)morpholine,
4-(2-butyl-1-octenyl)morpholine,
4-(2-hexyl-1-octenyl)morpholine,
4-(2-phenylstyryl)morpholine,
4-(2-phenylpropenyl)morpholine,
4-(3-methyl-2-phenyl-1-butenyl)morpholine,
4-(2-phenyl-1-octenyl)morpholine,
1-propenylpiperidine,
1-(1-heptenyl)piperidine,
N,N-diethyl-1-heptenylamine,
N-1-butenyl-N-methylaniline,
N,N-diethylstyrylamine,
1-propenylpyrrolidine,
N,N-diethyl-1-butenylamine,
1-(2-ethyl-1-butenyl)piperidine,
N,N-diethyl-2-methylpropenylamine,
4-(1-heptenyl)morpholine,
1-(2-ethyl-1-hexenyl)piperidine,
N,N,2-trimethylpropenylamine,
N,N-diisopropyl-(2-methylpropenyl)amine,
N-(2-methylpropenyl)diisobutylamine,
N-(2-methylpropenyl)dihexylamine,
p-isopropyl-N-(2-methylpropenyl)-N-tert-pentylaniline,
N-butyl-o-chloro-N-(2-methylpropenyl)aniline,
N-methyl-N-(2-methylpropenyl)-m-toluidine,
N-ethyl-N-(2-methylpropenyl)-3,5-xylidine,
N,3-dimethyl-N-(2-methylpropenyl)butylamine,
4-(2-methylpropenyl)thiamorpholine,
N-isopropyl-N-(2-methylpropenyl)hexylamine,
N-isopropyl-N-(2-methylpropenyl)-o-anisidine,
N-ethyl-N-(2-methylpropenyl)aniline,
N-hexyl-N-(2-methylpropenyl)aniline, and
N-ethyl-N-(2-methylpropyl)-2-methylpropenylamine, there were prepared 2,3-dihydro-3-ethyl-3-hexyl-2-morpholino-5-benzofuranol,
2,3-dihydro-3-methyl-3-isopropyl-2-morpholino-5-benzofuranol,
2,3-dihydro-3-methyl-3-pentyl-2-morpholino-5-benzofuranol,
2,3-dihydro-3,3-dibutyl-2-morpholino-5-benzofuranol,
2,3-dihydro-3-butyl-3-hexyl-2-morpholino-5-benzofuranol,
2,3-dihydro-3,3-dihexyl-2-morpholino-5-benzofuranol,
2,3-dihydro-3,3-diphenyl-2-morpholino-5-benzofuranol,
2,3-dihydro-3-methyl-3-phenyl-2-morpholino-5-benzofuranol,
2,3-dihydro-3-isopropyl-3-phenyl-2-morpholino-5-benzofuranol,
2,3-dihydro-3-hexyl-3-phenyl-2-morpholino-5-benzofuranol,
2,3-dihydro-3-methyl-2-piperidino-5-benzofuranol,
2,3-dihydro-3-pentyl-2-piperidino-5-benzofuranol,
2,3-dihydro-3-pentyl-2-diethylamino-5-benzofuranol,
2,3-dihydro-3-ethyl-2-(N-methylanilino)-5-benzofuranol,
2,3-dihydro-3-phenyl-2-diethylamino-5-benzofuranol,
2,3-dihydro-3-methyl-2-(1-pyrrolidinyl)-5-benzofuranol,
2,3-dihydro-3-ethyl-2-diethylamino-5-benzofuranol,
2,3-dihydro-3,3-dimethyl-2-diethylamino-5-benzofuranol,
2,3-dihydro-3,3-diethyl-2-piperidino-5-benzofuranol,
2,3-dihydro-3-pentyl-2-morpholino-5-benzofuranol,
2,3-dihydro-3-butyl-3-ethyl-2-piperidino-5-benzofuranol,
2,3-dihydro-3,3-dimethyl-2-dimethylamino-5-benzofuranol,
2,3-dihydro-3,3-dimethyl-2-diisopropylamino-5-benzofuranol,
2,3-dihydro-3,3-dimethyl-2-diisobutylamino-5-benzofuranol,
2,3-dihydro-3,3-dimethyl-2-dihexylamino-5-benzofuranol,
2,3-dihydro-3,3-dimethyl-2-(p-isopropyl-N-tert-pentylanilino)-5-benzofuranol,
2,3-dihydro-3,3-dimethyl-2-(o-chloro-N-butylanilino)-5-benzofuranol,
2,3-dihydro-3,3-dimethyl-2-(N-methyl-m-toluidino)-5-benzofuranol,
2,3-dihydro-3,3-dimethyl-2-(N-methyl-3,5-xylidino)-5-benzofuranol,
2,3-dihydro-3,3-dimethyl-2-(N,3-dimethylbutylamino)-5-benzofuranol,
2,3-dihydro-3,3-dimethyl-2-thiamorpholino-5-benzofuranol,
2,3-dihydro-3,3-dimethyl-2-(N-isopropylhexylamino)-5-benzofuranol,
2,3-dihydro-3,3-dimethyl-2-(N-isopropyl-o-anisidino)-5-benzofuranol,
2,3-dihydro-3,3-dimethyl-2-(N-ethylanilino)-5-benzofuranol,
2,3-dihydro-3,3-dimethyl-2-(N-hexylanilino)-5-benzofuranol, and
2,3-dihydro-3,3-dimethyl-2-(N-ethyl-2-methylpropylamino)-5-benzofuranol, respectively.

EXAMPLE 12

Following the procedure of Example 1, Part B, but substituting 2,3-dihydro-3-methyl-2-piperidino-5-benzofuranol,
2,3-dihydro-3-pentyl-2-piperidino-5-benzofuranol,
2,3-dihydro-3-pentyl-2-diethylamino-5-benzofuranol,
2,3,-dihydro-3-ethyl-2-(N-methylanilino)-5-benzofuranol,
2,3-dihydro-3-phenyl-2-diethylamino-5-benzofuranol,
2,3-dihydro-3-methyl-2-(1-pyrrolidinyl)-5-benzofuranol,
2,3-dihydro-3,3-dimethyl-2-diethylamino-5-benzofuranol,
2,3-dihydro,3-3-diethyl-2-piperidino-5-benzofuranol,
2,3-dihydro-3-ethyl-2-diethyamino-5-benzofuranol,
2,3-dihydro-3-pentyl-2-morpholino-5-benzofuranol,
2,3-dihydro-3-butyl-3-ethyl-2-piperidino-5-benzofuranol,
2,3-dihydro-3-ethyl-3-hexyl-2-morpholino-5-benzofuranol,
2,3-dihydro-3-methyl-3-isopropyl-2-morpholino-5-benzofuranol, 2,3-dihydro-3-methyl-3-pentyl-2-morpholino-5-benzofuranol,
2,3-dihydro-3-butyl-3-hexyl-2-morpholino-5-benzofuranol,
2,3-dihydro-3,3-dibutyl-2-morpholino-5-benzofuranol,
2,3-dihydro-3,3-dihexyl-2-morpholino-5-benzofuranol,
2,3-dihydro-3,3-diphenyl-2-morpholino-5-benzofuranol,
2,3-dihydro-3-methyl-3-phenyl-2-morpholino-5-benzofuranol,
2,3-dihydro-3-isopropyl-3-phenyl-2-morpholino-5-benzofuranol,
2,3-dihydro-3-hexyl-3-phenyl-2-morpholino-5-benzofuranol,
2,3-dihydro-3,3-dimethyl-2-dimethyl-amino-5-benzofuranol,
2,3-dihydro-3,3-dimethyl-2-diisopropylamino-5-benzofuranol,
2,3-dihydro-3,3-dimethyl-2-diisobutylamino-5-benzofuranol,
2,3-dihydro-3,3-dimethyl-2-dihexylamino-5-benzofuranol,
2,3-dihydro-3,3-dimethyl-2-(p-ispropyl-N-tert-pentylanilino)-5-benzofuranol,
2,3-dihydro-3,3-dimethyl-2-(o-chloro-N-butylanilino)-5-benzofuranol,
2,3-dihydro-3,3-dimethyl-2-(N-methyl-o-toluidino)-5-benzofuranol,
2,3-dihydro-3,3-dimethyl-2-(N-ethyl-3,5-xylidino)-5-benzofuranol,
2,3-dihydro-3,3-dimethyl-2-(N,3-dimethylbutylamino)-5-benzofuranol,
2,3-dihydro-3,3-dimethyl-2-thiamorpholino-5-benzofuranol,
2,3-dihydro-3,3-dimethyl-2-(N-isopropylhexylamino)-5-benzofuranol,
2,3-dihydro-3,3-dimethyl-2-(N-isopropyl-o-anisidino)-5-benzofuranol,
2,3-dihydro-3,3-dimethyl-2-(N-ethylanilino)-5-benzofuranol,
2,3-dihydro-3,3-dimethyl-2-(N-hexylanilino)-5-benzofuranol, and
2,3-dihydro-3,3-dimethyl-2-(N-ethyl-2-methylpropylamino)-5-benzofuranol for
2,3-dihydro-3,3-dimethyl-2-piperidino-5-benzofuranol, there were prepared
α-methyl-(2,5-dihydroxypenyl)acetaldehyde dibenzoate,
α-pentyl-(2,5-dihydroxyphenyl)acetaldehyde dibenzoate,
α-ethyl-(2,5-dihydroxyphenyl)acetaldehyde dibenzoate,
α-phenyl-(2,5-dihydroxyphenyl)acetaldehyde dibenzoate,
α,α-dimethyl-(2,5-dihydroxyphenyl)acetaldehyde dibenzoate,
α,α-diethyl-(2,5-dihydroxyphenyl)acetaldehyde dibenzoate,
α-butyl-α-ethyl-(2,5-dihydroxyphenyl)acetaldehyde dibenzoate,
α-ethyl-α-hexyl-(2,5-dihydroxyphenyl)acetaldehyde dibenzoate,
α-ispropyl-α-methyl-(2,5-dihydroxyphenyl)acetaldehyde dibenzoate,
α-methyl-α-pentyl-(2,5-dihydroxyphenyl)-acetaldehyde dibenzoate,
α,α-dibutyl-(2,5-dihydroxyphenyl)acetaldehyde dibenzoate,
α-butyl-α-hexyl-(2,5-dihydroxyphenyl)acetaldehyde dibenzoate,
α,α-dihexyl-(2,5-dihydroxyphenyl)acetaldehyde dibenzoate,
α,α-diphenyl-(2,5-dihydroxyphenyl)acetaldehyde dibenzoate,
α-methyl-α-phenyl-(2,5-dihydroxyphenyl)acetaldehyde dibenzoate,
α-isopropyl-α-phenyl-(2,5-dihydroxyphenyl)acetaldehyde dibenzoate, and
α-hexyl-α-phenyl-(2,5-dihydroxyphenyl)acetaldehyde dibenzoate.

EXAMPLE 13

Following the procedure of Example 1, Part C but substituting

α-methyl-(2,5-dihydroxyphenyl)acetaldehyde dibenzoate,
α-pentyl-(2,5-dihydroxyphenyl)acetaldehyde dibenzoate,
α,α-diethyl-(2,5-dihydroxyphenyl)acetaldehyde dibenzoate,
α-butyl-α-ethyl-(2,5-dihydroxyphenyl)acetaldehyde dibenzoate,
α-ethyl-α-hexyl-(2,5-dihydroxyphenyl)acetaldehyde dibenzoate,
α-isopropyl-α-methyl-(2,5-dihydroxyphenyl)acetaldehyde dibenzoate,
α-methyl-α-pentyl-(2,5-dihydroxphenyl)acetaldehyde dibenzoate,
α,α-dibutyl-(2,5-dihydroxyphenyl)acetaldehyde dibenzoate,
α-butyl-α-hexyl-(2,5-dihydroxyphenyl)acetaldehyde dibenzoate,
α,α-dihexyl-(2,5-dihydroxyphenyl)acetaldehyde dibenzoate,
α,α-diphenyl-(2,5-dihydroxyphenyl)acetaldehyde dibenzoate,
α-methyl-α-phenyl-(2,5-dihydroxyphenyl)acetaldehyde dibenzoate,
α-isopropyl-α-phenyl-(2,5-dihydroxyphenyl)acetaldehyde dibenzoate, and
α-hexyl-α-phenyl-(2,5-dihydroxyphenyl)acetaldehyde dibenzoate for
α,α-dimethyl-(2,5-dihydroxyphenyl)acetaldehyde dibenzoate, there were prepared:

2,3-dihydro-2-ethoxy-3-methyl-5-benzofuranol,
2,3-dihydro-2-ethoxy-3-pentyl-5-benzofuranol,
2,3-dihydro-3,3-diethyl-2-ethoxy-5-benzofuranol,
3-butyl-2,3-dihydro-2-ethoxy-3-ethyl-5-benzofuranol,
2,3-dihydro-3-ethyl-2-ethoxy-3-hexyl-5-benzofuranol,
2,3-dihydro-2-ethoxy-3-isopropyl-3-methyl-5-benzofuranol,
2,3-dihydro-2-ethoxy-3-methyl-3-pentyl-5-benzofuranol,
2,3-dihydro-3,3-dibutyl-2-ethoxy-5-benzofuranol,
3-butyl-2,3-dihydro-2-ethoxy-3-hexyl-5-benzofuranol,
3,3-dihexyl-2,3-dihydro-2-ethoxy-5-benzofuranol,
2,3-dihydro-3,3-diphenyl-2-ethoxy-5-benzofuranol,
2,3-dihydro-2-ethoxy-3-methyl-3-phenyl-5-benzofuranol,
2,3-dihydro-2-ethoxy-3-isopropyl-3-phenyl-5-benzofuranol, and
2,3-dihydro-2-ethoxy-3-hexyl-3-phenyl-5-benzofuranol,
respectively.

I claim:
1. α-substituted - (2,5 - dihydroxyphenyl)acetaldehyde diacylate of the structural formula

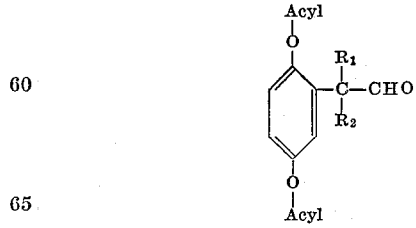

wherein "Acyl" is a hydrocarboncarboxylic acyl radical of from 1 to 8 carbon atoms, inclusive; $R_1$ is selected from the group consisting of hydrogen, lower-alkyl, and prenyl; and $R_2$ is selected from the group consisting of lower-alkyl and phenyl.

2. α,α-di-lower-alkyl - (2,5 - dihydroxyphenyl)acetaldehyde dibenzoate according to claim 1.

3. α,α - dimethyl - (2,5-dihydroxyphenyl)acetaldehyde dibenzoate according to claim 2.

4. The process which comprises reacting a 2-amino-2,3-dihydro-3-substituted-5-benzofuranol of the formula:

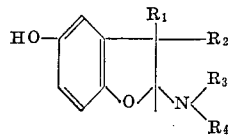

wherein $R_1$ is selected from the group consisting of hydrogen, lower-alkyl, and phenyl; $R_2$ is selected from the group consisting of lower-alkyl and phenyl; $R_3$ and $R_4$ taken separately are selected from the group consisting of lower-alkyl, phenyl, and substituted phenyl selected from the group consisting of lower-alkylphenyl, lower-alkoxyphenyl, and halophenyl, provided that $R_3$ and $R_4$ are not simultaneously selected from phenyl and substituted phenyl; and $R_3$ and $R_4$ taken together with $-\text{N}<$ constitute a saturated heterocyclic amino radical

of from 5 to 7 nuclear atoms, inclusive, wherein Z is a saturated bivalent radical selected from the group consisting of alkylene, oxadialkylene, thiadialkylene, and N-lower-alkylazadialkylene with a hydrocarboncarboxylic acid halide of from 1 to 8 carbon atoms, in the presence of an inert organic solvent and an acid acceptor, to produce an α-substituted-(2,5-dihydroxyphenyl)acetaldehyde diacylate of the formula:

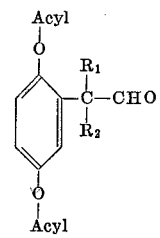

wherein $R_1$ and $R_2$ are as defined and Acyl is the acyl radical of the hydrocarboncarboxylic acid.

References Cited
UNITED STATES PATENTS

| | | | |
|---|---|---|---|
| 3,391,108 | 7/1968 | Hosler | 260—45.85 |
| 3,184,457 | 5/1965 | Brannock | 260—247.7 |

LORRAINE A. WEINBERGER, Primary Examiner

EDWARD JAY GLEIMAN, Assistant Examiner

U.S. Cl. X.R.

260—479